Patented Dec. 9, 1952

2,621,169

UNITED STATES PATENT OFFICE 2,621,169

PROCESS FOR PREPARING AMMONIUM SALTS OF COPOLYMER COMPOSITIONS

Hillary Robinette, Jr., Pennfield Downs, and Charles W. Pfeifer, Philadelphia, Pa., assignors to Publicker Industries Inc., Philadelphia, Pa., a corporation of Pennsylvania No Drawing. Application December 18, 1948, Serial No. 66,134

10 Claims. (Cl. 260—78.5)

The present invention relates to alkali salts of certain acidic polymeric compositions and more particularly to ammonium salts of copolymers of styrene and maleic anhydride and the like.

An object of the present invention is to provide a new and improved process for preparing alkali salts of certain acidic polymeric compositions. Another object of the present invention is to provide a new and improved process for preparing ammonium salts of copolymers of styrene and maleic anhydride (with or without cross-linking agents) and similar copolymers.

Other objects and advantages of the present invention are apparent in the following detailed description and appended claims.

Our present invention also relates to certain acidic polymers which are prepared by copolymerizing a polymerizable compound containing a single ethylene linkage with an ethylene dicarbonyl compound wherein the two carbonyl groups are connected directly to the respective carbon atoms of the ethylene linkage and with a polymerizable unconjugated cross-linking compound having at least two ethylene groups.

The polymerizable compounds containing a single ethylene group fall in three categories, namely:

$CH_2=CH-$ where the free valence bonds are satisfied by substituents other than hydrogen (as for example styrene, vinyl butyl ether, dichloro styrene, methyl acrylate, acrylonitrile, vinyl acetate, vinyl chloride, vinyl-O-toluate, vinyl phenyl acetate, and the like)

$-CH=CH-$ (as for example cinnamic acid, stilbene, β-chlorovinyl acetate, and the like)

$CH_2=C=$ (as for example vinylidene chloride, methyl isopropenyl ketone, α-chloro-α-phenyl ethylene, and the like)

From the foregoing, it is apparent that all of the polymerizable compounds have two or three hydrogens attached to the carbons of the ethylene linkage.

The ethylene dicarbonyl compounds include maleic anhydride, chloro maleic acid, the fumaric acid halides, fumaric acid, phenylmaleic acid, ethyl maleic acid, diethyl maleic acid, diphenyl maleic acid, citraconic acid, and the like.

The unconjugated cross-linking compound may be any compound having at least two $-CH=C=$ groups in the molecule and positioned therein in an unconjugated relationship with respect to one another. In this connection it is to be understood that the expression "unconjugated compound" as herein employed is also to be construed as including compounds wherein the $-CH=C=$ groups are separated by an aromatic nucleus such as, for example, divinyl benzene and divinyl naphthalene. The specific types of polymerizable unconjugated compounds contemplated by the aforesaid $-CH=C=$ grouping are compounds possessing at least two of the following groupings (and no others) in which such groupings may be the same or different; $-CH=CH-$, $CH_2=C=$ and $CH_2=CH-$. Examples of compounds specifically covered by the grouping $-CH=CH-$ are dicrotyl ether, $CH_3CH=CHCH_2-O-CH_2CH=CHCH_3$ allyl crotyl ether, $CH_2=CHCH_2-O-CH_2CH=CHCH_3$ vinyl crotyl ether, $CH_2=CH-O-CH_2CH=CHCH_3$ vinyl anol ether, $CH_2=CH-O-C_6H_5-CH=CHCH_3$ dicrotyl maleate, $$CH_3CH=CHCH_2-O-\overset{O}{\overset{\|}{C}}CH=CH\overset{O}{\overset{\|}{C}}-O-CH_2CH=CHCH_3$$

and the like. As examples of compounds specifically covered by the grouping $CH_2=C=$ wherein each of the two free valences is satisfied by a separate substituent other than hydrogen, there may be mentioned, di-β-chlorallyl ether, $CH_2=C(Cl)CH_2-O-CH_2(Cl)C=CH_2$ vinyl methallyl ether, $CH_2=C(CH_3)CH_2-O-CH=CH_2$ methallyl allyl ether, $CH_2=C(CH_3)CH_2-O-CH_2CH=CH_2$ trimethallyl glyceryl ether, $$CH_2=C(CH_3)CH_2-O-CH_2CHCH_2-O-CH_2C(CH_3)=CH_2$$
$$|$$
$$O-CH_2-C(CH_3)=CH_2$$

γ-phenyl-α-methyl allyl methallyl ether, $C_6H_5-CH=CHCH(CH_3)-O-CH_2-C(CH_3)=CH_2$ methallyl-α-phenyl allyl ether, $CH_2=CHCH(C_6H_5)-O-CH_2C(CH_3)=CH_2$ di-β-methallyl maleate, $$CH_2=C(CH_3)CH_2-O-\overset{O}{\overset{\|}{C}}CH=CH\overset{O}{\overset{\|}{C}}-O-CH_2(CH_3)C=CH_2$$

and the like. Specific examples of compounds including the grouping $CH_2=CH-$ are trivinyl meseate,

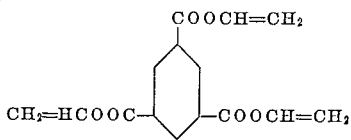

diallyl maleate,

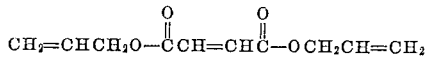

divinyl ether, $CH_2=CH-O-CH=CH_2$; trivinyl citrate,

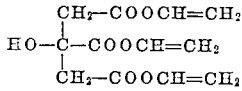

divinyl o-phenylene diacetate,

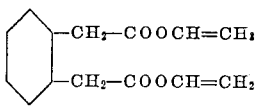

divinyl phenyl butyrate o-carboxylate,

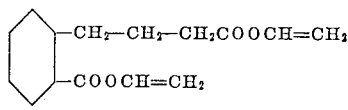

vinyl allyl ether, $CH_2=CH-O-CH_2-CH=CH_2$; allyl crotyl ether, $$CH_2=CH-CH_2-O-CH_2-CH=CH-CH_3$$

ethylene glycol divinyl ether, $$CH_2=CH-O-CH_2-CH_2-O-CH=CH_2$$

diethylene glycol diallyl ether, $$CH_2=CH-CH_2-O-CH_2-CH_2-O-$$
$$CH_2CH_2-O-CH_2-CH=CH_2$$

divinyl methyl glyceryl ether,

divinyl glyceryl ether,

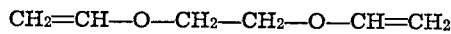

tetravinyl pentaerythritylether, $$C(CH_2OCH=CH_2)_4$$

hydroquinone divinyl ether,

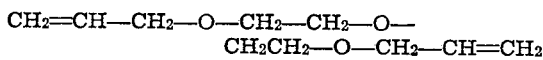

phenyl (1, 4 diethyl) divinyl ether,

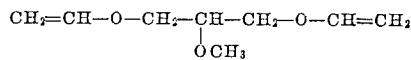

o-vinyl phenyl vinyl ether,

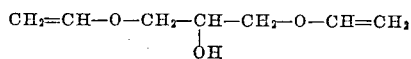

vinyl chavicol ether,

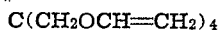

allyl ether of coniferyl allyl ether

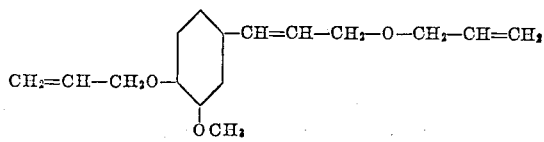

divinyl benzene, $H_2C=CH-C_6H_4-CH=CH_2$, and the like. Divinyl benzene is the preferred cross-linking compound.

Various conventional polymerization catalysts and solvents may also be employed in a manner more or less conventional in the art. As catalysts for the reactions involved herein there may be mentioned benzoyl peroxide, hydrogen peroxide, acetyl peroxide, urea peroxide, ascaridole peroxide, and the like.

The solvents which may be used are acetone, methyl isobutyl ketone, toluene, ethyl acetate, 1, 4-dioxane, chloroform, and the like.

Various alkali metal salts, including ammonium salts, of the aforesaid copolymers are useful as emulsifying agents in connection with the manufacture of furniture and automobile polishes, vanishing creams, hand lotions, floor waxes, and the like.

Such ammonium salts may be prepared by neutralizing the acidic polymer with a 28% aqueous solution of ammonium hydroxide.

This method of preparing ammonium salts of these acidic polymers by treatment with aqueous ammonium hydroxide is not entirely satisfactory, from a commercial standpoint, because it entails the evaporation of the aqueous reaction mixture and the drying of the ammonium salt and since the evaporation and drying of ammonium salts of this type cannot be carried on in conventional steel equipment such as is used commercially in view of the marked corrosive action on the steel. Moreover, the ammonium salts are apt to be partially decomposed to amides unless the evaporation and drying steps are carefully controlled and regulated to prevent excessively high temperatures.

We have now discovered a new and improved process for preparing ammonium salts of these acidic copolymers which process eliminates the disadvantages of the aqueous process and which permits the relatively quick, easy and inexpensive production of the ammonium salts in dry and relatively pure form.

Thus, we have found that quite surprisingly and unexpectedly, ammonium salts of these acidic copolymers can be produced quickly and easily in relatively pure dry form by simply dry-blending equivalent amounts of an ammonium carbonate with the acidic copolymers.

The following are illustrative, but not restrictive, examples of the process of the present invention:

EXAMPLE 1

An acidic copolymer of maleic anhydride and styrene cross-linked with divinyl benzene (which copolymer may be prepared according to Examples 8 to 18 hereinafter and which is known commercially under the trade-name "Pigel") is mixed with ammonium carbonate in equi-molar proportions, i. e. 20.2 parts by weight of the copolymer and 9.6 parts by weight of $(NH_4)_2CO_3$ and the mixture is allowed to stand in a loosely capped container. A sample removed after three days swells completely in cold water and has little or no odor of ammonia, indicating substantially complete conversion of the copolymer to the ammonium salt.

EXAMPLE 2

The procedure of Example 1 is repeated in a large silvered Dewar flask and the temperature is found to rise about 2° C. during the first half-hour and thereafter slowly to drop back to room temperature. While our measurements indicate that the heat of neutralization of the acidic copolymer with ammonia is less than that required for the decomposition of ammonium carbonate. so that the reaction on the whole is endothermic, the rapid evolution of ammonia during the initial stages of the reaction produces the slight rise in temperature recorded.

The product obtained is, again, completely swellable in cold water and has little or no ammonia-odor.

By way of contrast, if the acidic copolymer is treated with dry ammonia gas, the temperature rises as much as 150° C. if the rate of addition of the ammonia is not carefully controlled.

EXAMPLE 3

Five pounds of Pigel (that is, the acidic copolymer of maleic anhydride and styrene cross-linked with divinyl benzene) and 2.4 pounds of powdered ammonium carbonate (technical grade containing a minimum of 30% $NH_3$) are placed in a Paterson Dry Blender and mixed for about thirty minutes—the mixing being interrupted every few minutes and the gas-tight cover loosened to permit release of pressure resulting from the gaseous decomposition products.

A sample taken after twenty-four hours mixing swelled in water rather slowly and was not as clear as samples taken at later stages of mixing.

A sample taken after forty-eight hours mixing was completely satisfactory as to water-swellability and absence of ammonia odor. A 1% aqueous solution of this 48-hour sample gave a pH of 7.6.

EXAMPLE 4

The procedure of Example 1 is repeated except that, in place of Pigel, there is employed an acidic copolymer known commercially by the trade-name "Pisol" which is a copolymer of maleic anhydride and styrene, without the cross-linking agent (and which may be prepared in a manner similar to that used for Pigel except that the divinyl benzene is omitted) with comparable results—the product being again completely swellable in cold water and having little or no ammonia odor.

EXAMPLE 5

The procedure of Example 3 is repeated except that Pisol is used in place of the Pigel and with a porous cover or filter cloth used in place of the gas-tight cover of the blender, in order to permit the escape of the carbon dioxide formed during the reaction. A sample taken after four days mixing was very good as to water-swellability and absence of ammonia odor—a 5% solution giving a pT of 7.1.

EXAMPLE 6

The copolymer known as Pigel is mixed with ammonium bicarbonate in the proportion of 16 parts of dry $NH_4.HCO_3$ to 20 parts of dry polymer and the mixture run in a Paterson Dry Blender. The formation of the ammonium salt of the polymer took place more slowly than was the case in the comparable Example 3—approximately six days of mixing being required for complete salt formation as evidenced by complete water-swellability and absence of ammonia odor.

EXAMPLE 7

The procedure of Example 6 is repeated except that the copolymer known as Pisol is used in place of the Pigel. The results were generally comparable to those of Example 6—there being complete salt formation but with a considerably longer period of time being required than is the case with $(NH_4)_2CO_3$.

Similar experiments conducted on various other acidic copolymers formed from polymerizable compounds having at least one ethylene group, ethylene dicarbonyl compounds and, optionally, polymerizable unconjugated cross-linking compounds having at least two ethylene groups, as mentioned hereinabove, give results generally comparable to those set forth in Examples 1–7 and indicate that it is possible effectively to form ammonium salts of these various acidic copolymers in dry form by simply dry-blending the copolymer with an ammonium carbonate or the like in substantially equi-molar amounts, so as to eliminate the need for the corrosive water-elimination steps which would otherwise be necessary.

As mentioned above, this not only greatly reduces the cost, from a commercial manufacturing standpoint, but also ensures a pure product since it minimizes the possibility of conversion to amides.

The preparation of copolymers is illustrated in Examples 8 to 18.

EXAMPLE 8

A mixture consisting of 156 parts of styrene, 60 parts of maleic anhydride, 1.5 parts of divinyl benzene, 218 parts of acetone, 0.15 part of benzoyl peroxide is refluxed on a water bath. The solution begins to thicken and gel after about one hour; however the reaction is allowed to continue for four hours. The product is a clear gelled material. The anhydride polymer may be recovered by evaporation of the acetone leaving a clear hard resin.

EXAMPLE 9

A mixture consisting of 78.39 parts of styrene, 1.5 parts of divinyl benzene, 30 parts of maleic anhydride, 109 parts of ethyl acetate, 0.15 part of benzoyl peroxide is refluxed on a water bath for three hours to give a white opaque gel.

EXAMPLE 10

A mixture consisting of 104 parts of styrene, 98 parts of maleic anhydride, 1 part of divinyl benzene and 0.2 part of benzoyl peroxide in 218 parts of acetone is refluxed for six hours on a water bath to give a very hard clear gel.

EXAMPLE 11

A mixture consisting of 273.52 parts of styrene, 98 parts of maleic anhydride, 0.18 part of benzoyl peroxide and 13 parts of divinyl benzene in 275 parts of acetone is refluxed for five hours to give a clear gel.

EXAMPLE 12

A mixture consisting of 104 parts of styrene, 20 parts of maleic anhydride, 1.5 parts of divinyl benzene and 0.18 part of benzoyl peroxide in 220 parts of acetone is refluxed for six and one-half hours to give a very soft, clear gel.

EXAMPLE 13

A mixture consisting of 273.52 parts of styrene, 98 parts of maleic anhydride, 0.18 part of benzoyl peroxide and 1.4 parts of divinyl benzene in 275 parts of acetone is refluxed for six hours to give a soft, sticky gel.

EXAMPLE 14

A mixture consisting of 273.52 parts of styrene, 98 parts of maleic anhydride, 0.18 part of benzoyl peroxide, and 41 parts of divinyl benzene in 275 parts of acetone is refluxed for three hours to give a friable non-tacky, clear gel.

EXAMPLE 15

A mixture consisting of 150 parts of styrene, 60 parts of maleic anhydride, 8 parts of divinyl ether, and 0.15 part of benzoyl peroxide in 218 parts of acetone is refluxed for eleven and one-half hours on a water bath. The upper portions of the condenser employed in this particular run is externally cooled with dry ice in order to prevent loss of divinyl ether. A high viscous, clear gel is obtained.

EXAMPLE 16

A mixture consisting of 78 parts of styrene, 30 parts of maleic anhydride, 0.78 part of divinyl benzene, and 0.075 part of benzoyl peroxide in 409 parts of toluene is refluxed two and one-half hours. The polymer thus formed precipitates as a relatively fine white powder and may be readily separated by filtering through a suitable suction funnel.

EXAMPLE 17

A mixture consisting of 156 parts of styrene, 60 parts of maleic anhydride, 0.156 part of divinyl benzene and 0.15 part of benzoyl peroxide in 218 parts of acetone is refluxed on the water bath for about five hours. A viscous liquid product results.

EXAMPLE 18

A mixture consisting of 156 parts of styrene, 60 parts of maleic anhydride, 0.78 part of divinyl benzene, and 0.15 part of benzoyl peroxide in 218 parts of acetone is refluxed on a water bath for five hours to give a soft, sticky gel.

Utility of salts

The ammonium salts produced by the process of the present invention can be used as emulsifiers in furniture and automobile polishes, vanishing creams, hand lotions, floor waxes, and the like.

The salts of the present invention possess the peculiar property of being capable of imbibing unusually large amounts of water as well as other compounds such as glycerine, ethylene glycol, and the like. Thus, as little as 1% to 2% of a salt of the type contemplated by the present invention in water will produce masses varying from highly viscous liquids to compositions of paste or dough-like consistency. By virtue of this unusual property the salts are highly useful as thickening agents for printing paste, cold water paints and a wide range of other industrial materials containing water, glycerine or similar substances.

The polymeric salts of our invention are likewise useful in improving the wet strength of paper and in increasing the stability of latices to pressure and shearing forces.

A highly useful application of the polymeric salts of our invention relates to utilization of these compounds as emulsifying agents in the preparation of stable oil-in-water emulsions.

The application of these polymeric salts as emulsifying agents may be illustrated by the following examples.

EXAMPLE 19

There is prepared a solution consisting of 3200 parts of water and about 200 parts of the ammonium salt of a dry polymer prepared by the copolymerization of maleic anhydride, styrene and divinyl benzene. The resulting mixture is stirred with a suitable batter mixer until a smooth, homogeneous gel is obtained. To this gel is then added 700 parts of mineral oil and 1400 parts of kerosene. Stirring is continued until homogenity is obtained, after which 4200 parts of water is added with stirring. The product thus obtained is a homogeneous cream suitable for use as a cleansing composition. This product, after standing for a period of more than four months, appears to be still in a state of perfect emulsion.

EXAMPLE 20

There is prepared a solution consisting of 3200 parts of water and about 200 parts of the ammonium salt of a dry polymer prepared by the copolymerization of maleic anhydride, styrene, and divinyl benzene. The resulting mixture is stirred with a suitable mechanical stirring device until a smooth, homogeneous gel is obtained. To this gel is then added 700 parts of mineral oil (U. S. P. paraffin oil) and 1400 parts of kerosene. Stirring is continued until homogenity is obtained, after which 4200 parts of water is added. A sufficient quantity of perfume oil is next added to obtain a suitable odoriferous cream. The product thus obtained is a homogeneous, white, non-flowing, smooth cream suitable for use as a skin cleansing composition.

EXAMPLE 21

There is prepared a solution consisting of 3200 parts of water and about 145 parts of the ammonium salt of a dry polymer prepared by copolymerizing styrene, maleic anhydride, and divinyl ether. The resulting mixture is stirred until a smooth homogeneous gel is obtained. To the resulting product is next added 700 parts of mineral oil (U. S. P. paraffin oil) and 1400 parts of kerosene. Agitation of this mass is continued until it becomes homogeneous after which is then added with stirring, 4200 parts of water to give a homogeneous, white, highly viscous, creamy liquid having excellent cleansing properties.

Aqueous preparation of ammonium salts

Ammonium salts of the acidic copolymers may be prepared by neutralizing the acidic copolymer with a 28% aqueous solution of ammonium hydroxide.

EXAMPLE 22

To a solution consisting of 3200 parts of water and 125 parts of a 28% solution of ammonium hydroxide is added 175 parts of a dry polymer prepared by copolymerization of maleic anhydride, styrene and divinyl benzene. The resulting mixture is stirred with a suitable mechanical stirring device until a smooth, homogeneous gel is obtained.

EXAMPLE 23

To a solution consisting of 90 parts of a 28% solution of ammonium hydroxide in 3200 parts of water is added 125 parts of a dry polymer prepared by copolymerizing styrene, maleic anhydride and divinyl ether. The resulting mixture is stirred until a smooth homogeneous gel is obtained.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. A process which comprises the steps of mixing a dry powdered ammonium carbonate with an acidic copolymer of maleic anhydride and styrene in substantially equi-molar proportions by weight and dry-blending the mixture until it is substantially completely swellable in water and is substantially free of ammonia-odor.

2. A process which comprises the steps of mixing dry powdered ammonium carbonate with an acidic copolymer of maleic anhydride and styrene cross-linked with divinyl benzene, in substantially equi-molar proportions by weight and dry-blending the mixture until it is substantially completely swellable in water and is substantially free of ammonia-odor.

3. A process according to claim 8 wherein the ammonium carbonate is $(NH_4)_2CO_3$.

4. A process according to claim 8 wherein the ammonium carbonate is $NH_4.H.CO_3$.

5. A process according to claim 1 wherein the ammonium carbonate is $(NH_4)_2CO_3$.

6. A process according to claim 1 wherein the ammonium carbonate is $NH_4.H.CO_3$.

7. A process for preparing ammonium salts of acidic copolymers in relatively pure dry form which comprises the steps of mixing a dry powdered ammonium carbonate in substantially equi-molar proportions by weight with an acidic copolymer formed by copolymerizing an ethylene dicarbonyl compound of the group consisting of maleic anhydride, chloro maleic acid, the fumaric acid halides, fumaric acid, phenylmaleic acid, ethyl maleic acid, diethyl maleic acid, diphenyl maleic acid and citraconic acid, and a compound capable of polymerizing with said ethylene dicarbonyl compound and containing a single

group in which not less than two and not more than three of the free valences are satisfied by hydrogen, and thereafter dry-blending until the mixture is substantially completely swellable in water and substantially free of ammonia-odor.

8. A process for preparing ammonium salts of acidic copolymers in relatively pure dry form which comprises the steps of mixing a dry powdered ammonium carbonate in substantially equi-molar proportions by weight with an acidic copolymer formed by copolymerizing an ethylene dicarbonyl compound of the group consisting of maleic anhydride, chloro maleic acid, the fumaric acid halides, fumaric acid, phenyl maleic acid, ethyl maleic acid, diethyl maleic acid, diphenyl maleic acid and citratonic acid, an unconjugated cross-linking agent having at least two ethylenic groups, and a compound capable of copolymerizing with said ethylene dicarbonyl compound and said cross-linking agent and containing a single

group in which not less than two and not more than three of the free valences are satisfied by hydrogen, and thereafter dry-blending until the mixture is substantially completely swellable in water and substantially free of ammonia-odor.

9. A process for preparing ammonium salts of acidic copolymers in relatively pure dry form which comprises the steps of mixing a dry powdered ammonium carbonate in substantially equi-molar proportions by weight with an acidic copolymer formed by copolymerizing an ethylene dicarbonyl compound of the group consisting of maleic anhydride, chloro maleic acid, the fumaric acid halides, fumaric acid, phenyl maleic acid, ethyl maleic acid, diethyl maleic acid, diphenyl maleic acid and citratonic acid, and a compound capable of polymerizing with said ethylene dicarbonyl compound and containing a single $CH_2=CH-$ group, and thereafter dry-blending until the mixture is substantially completely swellable in water and substantially free of ammonia-odor.

10. A process for preparing ammonium salts of acidic copolymers in relatively pure dry form which comprises the steps of mixing a dry powdered ammonium carbonate in substantially equi-molar proportions by weight with an acidic copolymer formed by copolymerizing an ethylene dicarbonyl compound of the group consisting of maleic anhydride, chloro maleic acid, the fumaric acid halides, fumaric acid, phenyl maleic acid, ethyl maleic acid, diethyl maleic acid, diphenyl maleic acid and citratonic acid, an unconjugated cross-linking agent having at least two ethylenic groups, and a compound capable of copolymerizing with said ethylene dicarbonyl compound and said cross-linking agent and containing a single $CH_2=CH-$ group.

HILLARY ROBINETTE, Jr.
CHARLES W. PFEIFER.

REFERENCES CITED

The following references are of record in the file of this patent:

UNITED STATES PATENTS

| Number | Name | Date |
| --- | --- | --- |
| 2,409,861 | Hunter et al. | Oct. 22, 1946 |